United States Patent
Cave

(10) Patent No.: US 8,654,400 B2
(45) Date of Patent: Feb. 18, 2014

(54) GENERATING 1-BIT IMAGE DATA FROM MULTIPLE-BIT IMAGE DATA FOR PRODUCING WHEN PRINTED A DOT IMAGE WITH REDUCED DOT GAIN AND APPEARANCE OF PATTERNING CAUSED BY ISOLATED DIAGONALLY ADJACENT PIXELS

(76) Inventor: Andrew William Peter Cave, Oakington (GB)

( * ) Notice: Subject to any disclaimer, the term of this patent is extended or adjusted under 35 U.S.C. 154(b) by 96 days.

(21) Appl. No.: 13/395,092

(22) PCT Filed: Sep. 9, 2010

(86) PCT No.: PCT/GB2010/001701
§ 371 (c)(1), (2), (4) Date: May 4, 2012

(87) PCT Pub. No.: WO2011/030101
PCT Pub. Date: Mar. 17, 2011

(65) Prior Publication Data
US 2012/0218607 A1    Aug. 30, 2012

(30) Foreign Application Priority Data

Sep. 11, 2009  (GB) .................................. 0915976.5

(51) Int. Cl.
*H04N 1/407* (2006.01)
*H04N 1/405* (2006.01)
*H04N 1/409* (2006.01)

(52) U.S. Cl.
CPC .............. *H04N 1/407* (2013.01); *H04N 1/409* (2013.01); *H04N 1/405* (2013.01)
USPC ........ 358/3.01; 358/3.06; 358/3.21; 358/3.26

(58) Field of Classification Search
USPC ............. 358/1.9, 3.01–3.06, 3.09, 3.11–3.23, 358/521, 534–536; 347/15, 131, 240, 251
See application file for complete search history.

(56) References Cited

U.S. PATENT DOCUMENTS

| 4,654,721 A | 3/1987 | Goertzel et al. |
| 5,087,981 A | 2/1992 | Ng et al. |

(Continued)

OTHER PUBLICATIONS

Neuhoff, D. L., et al., "One-dimensional Least-squares Model-based Halftoning," Speech Processing 1. San Francisco, Mar. 23-26, 1992, Proceedings of the International Conference on Acoustics, Speech and Signal Processing (ICASSP), New York, IEEE, U.S., vol. 3, Mar. 23, 1992, pp. 189-192.

(Continued)

*Primary Examiner* — Scott A Rogers
(74) *Attorney, Agent, or Firm* — DASCENZO Intellectual Property Law, P.C.

(57) ABSTRACT

A computer program for, or method of, generating 1-bit image data from multiple-bit image data, by a process which comprises the steps of: receiving multiple-bit image data comprising multiple-bit pixel values; and deriving from the multiple-bit pixel values 1-bit image data comprising "on" and "off pixel values, each pixel value of the 1-bit image data corresponding to a pixel of an output medium, which pixel an output device would attempt to mark when printing the 1-bit image data if the pixel value were "on", the 1-bit image data producing when printed an image constituted by dots, each dot corresponding to a plurality of pixel values of the 1-bit image data, which pixel values correspond to a block of M*N horizontally and/or vertically adjacent pixels of an output is medium, at least one of M and N being greater than one, wherein for at least some of the dots, where M or N is equal to one, a pixel value corresponding to a first or last pixel of a row of horizontally adjacent pixels, or to a first or last pixel of a column of vertically adjacent pixels, is "off, and where both M and N are greater than one, at least one pixel value corresponding to a pixel of a first or last row of horizontally adjacent pixels is "off and/or at least one pixel value 20 corresponding to a pixel of a first or last column of vertically adjacent pixels is "off.

15 Claims, 13 Drawing Sheets

(56) References Cited

U.S. PATENT DOCUMENTS

| | | | |
|---|---|---|---|
| 5,278,671 A | | 1/1994 | Takahashi et al. |
| 5,375,002 A | * | 12/1994 | Kim et al. .................... 358/3.03 |
| 5,469,267 A | * | 11/1995 | Wang ........................... 358/3.21 |
| 5,475,497 A | | 12/1995 | Neuhoff et al. |
| 5,557,709 A | * | 9/1996 | Shu .............................. 358/3.05 |
| 5,602,572 A | | 2/1997 | Rylander |
| 5,684,932 A | * | 11/1997 | Shu .............................. 358/3.09 |
| 5,854,882 A | | 12/1998 | Wang |
| 5,859,955 A | * | 1/1999 | Wang ........................... 358/3.19 |
| 2005/0190385 A1 | | 9/2005 | Chang |
| 2008/0246999 A1 | | 10/2008 | Guo |

OTHER PUBLICATIONS

Pappas, T. N., et al., "Printer Models and Error Diffusion," IEEE Transactions on Image Processing, IEEE Service Center, Piscataway, New Jersey, U.S., vol. 4, No. 1, Jan. 1, 1995, pp. 66-80.

* cited by examiner

GENERATING 1-BIT IMAGE DATA FROM MULTIPLE-BIT IMAGE DATA FOR PRODUCING WHEN PRINTED A DOT IMAGE WITH REDUCED DOT GAIN AND APPEARANCE OF PATTERNING CAUSED BY ISOLATED DIAGONALLY ADJACENT PIXELS

FIELD OF THE INVENTION

This invention relates to a computer program for generating 1-bit image data from multiple-bit image data, and more particularly to a computer program for generating 1-bit image data that, when printed, produce an image constituted by dots and having little or no appearance of patterning to a human eye.

BACKGROUND TO THE INVENTION

Computer programs for generating 1-bit image data comprising "on" and "off" pixel values from multiple-bit image data, which 1-bit image data, when printed, produce an image that is constituted by dots, are well known, the process of generating the 1-bit image data being known as "screening".

Such computer programs fall into two broad categories. The first category carry out so-called "amplitude modulated" (AM) screening to generate 1-bit image data that, when printed, produce an image that is constituted by a plurality of sizes of dots, the dots being regularly spaced throughout the image.

The second category carry out so-called "frequency modulated" (FM) screening to generate 1-bit image data that, when printed, produce an image that is constituted by a plurality of densities of dots, the dots typically all having the same size.

Each pixel value of the 1-bit image data corresponds to a pixel of an output medium. When printing the 1-bit image data, an output device attempts to mark those pixels of the output medium which correspond to "on" pixel values of the 1-bit image data.

Many output devices cannot reliably mark an isolated pixel, i.e. a pixel surrounded by unmarked pixels, or even an isolated small block of horizontally and vertically adjacent pixels, of an output medium.

A few output devices can fully mark a pixel of the output medium without marking adjacent pixels. Most output devices, however, either do not fully mark the pixel, which gives rise to so-called "dot loss", or also mark adjacent pixels, which gives rise to so-called "dot gain".

A problem with both AM and FM screening is that dots consisting of isolated pixels or isolated small blocks of horizontally and vertically adjacent pixels may not be marked by an output device. This has the effect that portions of an image of which the densities of marked pixels are low, so-called "highlights", appear too light, because not all of the pixels of an output medium that correspond to "on" pixel values of the 1-bit image data are marked by the output device.

Another problem with both AM and FM screening is that isolated pixels or isolated small blocks of horizontally and vertically adjacent pixels corresponding to "off" pixel values of the 1-bit image data surrounded by pixels corresponding to "on" pixel values may also be marked by the output device when marking the surrounding pixels as a result of dot gain. This has the effect that portions of an image of which the densities of marked pixels are high, so-called "shadows", appear too dark, because some of the pixels of an output medium that correspond to "off" pixel values of the 1-bit image data, as well as those pixels that correspond to "on" pixel values, are marked by the output device.

A particular problem with FM screening is the appearance of patterning of the image. The appearance of patterning results from dot gain because isolated pairs of diagonally adjacent marked pixels exhibit more dot gain than isolated pairs of horizontally or vertically adjacent marked pixels.

FIG. 1 represents a portion 10 of an output medium on which an isolated pair of horizontally adjacent pixels 12 and 14, an isolated pair of vertically adjacent pixels 16 and 18, and an isolated pair of diagonally adjacent pixels 20 and 22 have been marked by an output device that produces dot gain. As can be seen from FIG. 1, marking of the pair of horizontally adjacent pixels 12 and 14 causes six regions 24, 26, 28, 30, 32 and 34 of the surrounding pixels also to be marked as a result of dot gain. Marking of the pair of vertically adjacent pixels 16 and 18 also causes six regions 36, 38, 40, 42, 44 and 46 also to be marked. Marking of the pair of diagonally adjacent pixels 20 and 22, however, causes eight regions 48, 50, 52, 54, 56, 58, 60 and 62 also to be marked. The pair of diagonally adjacent marked pixels 20 and 22 would therefore appear darker than the pairs of horizontally and vertically adjacent marked pixels 12 and 14 and 16 and 18.

Portions of an image containing isolated pairs of diagonally adjacent marked pixels, such as marked pixels 20 and 22 of FIG. 1, can have an appearance of patterning, because the isolated pairs of diagonally adjacent marked pixels appear darker than nearby isolated pairs of horizontally and vertically adjacent marked pixels.

SUMMARY OF THE INVENTION

According to the invention there is provided a computer program for executing on a computer system a computer process for generating 1-bit image data from multiple-bit image data, the process comprising the steps of:

receiving multiple-bit image data comprising multiple-bit pixel values; and deriving from the multiple-bit pixel values 1-bit image data comprising "on" and "off" pixel values, each pixel value of the 1-bit image data corresponding to a pixel of an output medium, which pixel an output device would attempt to mark when printing the 1-bit image data if the pixel value were "on", the 1-bit image data producing when printed an image constituted by dots, each dot corresponding to a plurality of pixel values of the 1-bit image data, which pixel values correspond to a block of M*N horizontally and/or vertically adjacent pixels of an output medium, at least one of M and N being greater than one, wherein for at least some of the dots, where M or N is equal to one, a pixel value corresponding to a first or last pixel of a row of horizontally adjacent pixels, or to a first or last pixel of a column of vertically adjacent pixels, is "off", and where both M and N are greater than one, at least one pixel value corresponding to a pixel of a first or last row of horizontally adjacent pixels is "off" and/or at least one pixel value corresponding to a pixel of a first or last column of vertically adjacent pixels is "off".

The invention can provide a computer program that can generate 1-bit image data that can reliably be printed by any output device, because each "on" pixel value of the 1-bit image data corresponds to a pixel of a block of horizontally and vertically adjacent pixels of an output medium that are marked by the output device when printing the 1-bit image data.

The invention can also provide a computer program that can generate 1-bit image data that, when printed, produce an image that has relatively little appearance of patterning in portions of the image of which the densities of dots are relatively low, because the difference between the dot gain exhibited by isolated pairs of diagonally adjacent dots and the dot gain exhibited by at least one of isolated pairs of horizontally adjacent dots and isolated pairs of vertically adjacent dots is reduced.

Some output devices mark pixels of an output medium corresponding to pixel values of the 1-bit image data that are one, whereas other output devices mark pixels corresponding to pixel values of the 1-bit image data that are zero. For the avoidance of doubt, "on" pixel values of the 1-bit image data can be either one or zero, the "off" pixel values then being zero or one, respectively.

The 1-bit image data may advantageously produce when printed an image constituted by a plurality of clusters of dots, the clusters being of different sizes and substantially regularly spaced throughout the image. That is to say, the 1-bit image data are derived by AM screening.

Preferably the 1-bit image data produce when printed an image constituted by a plurality of densities of dots. That is to say, the 1-bit image data are derived by FM screening.

FIG. 2 represents a portion 100 of an output medium on which an isolated pair of horizontally adjacent dots 110 and 112, an isolated pair of vertically adjacent dots 114 and 116, and an isolated pair of diagonally adjacent dots 118 and 120 have been marked, each dot corresponding to two pixel values, which pixel values correspond to a column of 1*2 vertically adjacent pixels of the output medium.

As can be seen from FIG. 2, marking of the pair of horizontally adjacent dots 110 and 112 causes eight regions 122, 124, 126, 128, 130, 132, 134 and 136 of the surrounding pixels also to be marked as a result of dot gain. Marking of the pair of vertically adjacent dots 114 and 116 causes ten regions 138, 140, 142, 144, 146, 148, 150, 152, 154 and 156 also to be marked. Marking of the pair of diagonally adjacent dots 118 and 120 causes twelve regions 158, 160, 162, 164, 166, 168, 170, 172, 174, 176, 178 and 180 also to be marked. The pair of diagonally adjacent dots 118 and 120 would therefore appear somewhat darker than the pair of vertically adjacent dots 114 and 116, but very much darker than the pair of horizontally adjacent dots 110 and 112.

FIG. 3 represents a portion 200 of an output medium on which an isolated pair of horizontally adjacent dots 210 and 212, an isolated pair of vertically adjacent dots 214 and 216, and an isolated pair of diagonally adjacent dots 218 and 220 have been marked, each dot corresponding to two pixel values, which pixel values correspond to a column of 1*2 vertically adjacent pixels of the output medium, wherein for each dot, a pixel value corresponding to a first pixel of the column of vertically adjacent pixels is "off", in accordance with the invention.

As can be seen from FIG. 3, marking of the pair of horizontally adjacent dots 210 and 212 causes six regions 222, 224, 226, 228, 230 and 232 of the surrounding pixels also to be marked. Marking of the pair of vertically adjacent dots 214 and 216 causes eight regions 234, 236, 238, 240, 242, 244, 246 and 248 also to be marked. Marking of the pair of diagonally adjacent dots 218 and 220 also causes eight regions 250, 252, 254, 256, 258, 260, 262 and 264 also to be marked.

The pair of diagonally adjacent dots 218 and 220 produced according to the invention would therefore appear somewhat darker than the pair of horizontally adjacent dots 210 and 212, but no darker than the pair of vertically adjacent dots 214 and 216.

A similar result would have been obtained had the plurality of pixel values corresponded to a row of 2*1 horizontally adjacent pixels of the output medium, wherein for each dot, a pixel value corresponding to a first pixel of the row of horizontally adjacent pixels is "off", except that an isolated pair of diagonally adjacent dots would have appeared somewhat darker than an isolated pair of vertically adjacent dots, but no darker than an isolated pair of horizontally adjacent dots.

The multiple-bit image data may, for example, comprise 8-bit continuous tone raster image data.

For the purpose of this specification, an "output medium" is a medium that can be marked so as to cause an image to appear on the medium and an "output device" is a device operable to mark an output medium. Examples of output media include paper, printing plates for use in printing presses and photosensitive film for use in making printing plates. Examples of output devices include inkjet printers, computer-to-film imagesetters, computer-to-plate systems and printing presses.

While M and N can take any values provided that at least one of M and N is greater than one, typically M is either equal to N or half or twice N.

Preferably both of M and N are greater than one, and for at least some of the dots, at least one pixel value corresponding to a pixel of at least one of first and last rows of horizontally adjacent pixels of the block is "off" and at least one pixel value corresponding to a pixel of at least one of first and last columns of vertically adjacent pixels of the block is "off".

Where M and N are both greater than one, for at least some of the dots, the pixel values corresponding to the pixels of at least one of first and last rows of horizontally adjacent pixels and at least one of first and last columns of vertically adjacent pixels may advantageously be "off".

Where these pixel values are "off", the invention can provide a computer program that can generate 1-bit image data that, when printed, produce an image that has little or no appearance of patterning in portions of the image of which the densities of dots are relatively low, because isolated pairs of diagonally adjacent dots exhibit the same amount of dot gain as isolated pairs of horizontally adjacent and vertically adjacent dots.

FIG. 4 represents a portion 300 of an output medium on which an isolated pair of horizontally adjacent dots 310 and 312, an isolated pair of vertically adjacent dots 314 and 316, and an isolated pair of diagonally adjacent dots 318 and 320 have been marked, each dot corresponding to nine pixel values, which pixel values correspond to a block of 3*3 horizontally and vertically adjacent pixels of the output medium.

As can be seen from FIG. 4, marking of the pair of horizontally adjacent dots 310 and 312 causes eighteen regions 320, 322, 324, 326, 328, 330, 332, 334, 336, 338, 340, 342, 344, 346, 348, 350, 352 and 354 of the surrounding pixels also to be marked as a result of dot gain. Marking of the pair of vertically adjacent dots 314 and 316 also causes eighteen regions 356, 358, 360, 362, 364, 366, 368, 370, 372, 374, 376, 378, 380, 382, 384, 386, 388 and 390 also to be marked. Marking of the pair of diagonally adjacent dots 318 and 320 causes twenty-four regions 392, 394, 396, 398, 400, 402, 404, 406, 408, 410, 412, 414, 416, 418, 420, 422, 424, 426, 428, 430, 432, 434, 436 and 438 also to be marked. The pair of diagonally adjacent dots 318 and 320 would therefore appear darker than the pairs of horizontally adjacent and vertically adjacent dots 310 and 312 and 314 and 316.

FIG. 5 represents a portion 500 of an output medium on which an isolated pair of horizontally adjacent dots 510 and 512, an isolated pair of vertically adjacent dots 514 and 516, and an isolated pair of diagonally dots 518 and 520 have been marked, each dot corresponding to nine pixel values, which pixel values correspond to a block of 3*3 horizontally and vertically adjacent pixels of the output medium, wherein for each dot, pixel values corresponding to a first row of horizontally adjacent pixels and to a first column of vertically adjacent pixels are "off", in accordance with the invention.

As can be seen from FIG. 5, marking of the pair of horizontally adjacent dots 510 and 512 causes sixteen regions 522, 524, 526, 528, 530, 532, 534, 536, 538, 540, 542, 544, 546, 548, 550 and 552 of the surrounding pixels also to be marked. Marking of the pair of vertically adjacent dots 514 and 516 also causes sixteen regions 554, 556, 558, 560, 562, 564, 566, 568, 570, 572, 574, 576, 578, 580, 582 and 584 also to be marked. Marking of the pair of diagonally adjacent dots 518 and 520 also causes sixteen regions 586, 588, 590, 592, 594, 596, 598, 600, 602, 604, 606, 608, 610, 612, 614 and 616 also to be marked.

The pair of diagonally adjacent dots 518 and 520 produced according to the invention would appear no darker than the pair of horizontally adjacent dots 510 and 512 or the pair of vertically adjacent dots 514 and 516, and portions of an image of which the densities of such dots are relatively low would be substantially free of the appearance of patterning.

For all of the dots, where M or N is equal to one, a pixel value corresponding to a first or last pixel of a row of horizontally adjacent pixels, or to a first or last pixel of a column of vertically adjacent pixels, may advantageously be "off" and where both M and N are greater than one, at least one pixel value corresponding to a pixel of a first or last row of horizontally adjacent pixels may advantageously be "off" and/or at least one pixel value corresponding to a pixel of a first or last column of vertically adjacent pixels may advantageously be "off".

It has been found that some output devices, in particular some computer-to-plate systems, cannot reliably mark isolated pixels or isolated small blocks of horizontally and vertically adjacent pixels unless a relatively high proportion of pixels in the neighbourhood of the isolated pixels or small blocks of pixels are also marked. This is believed to be because marking of the pixels in the neighbourhood of the isolated pixels or small blocks of pixels, which is typically by means of heating the pixels by exposure to a laser beam, also slightly heats the isolated pixels or small blocks of pixels, making them easier to mark.

Alternatively, therefore, for densities of dots greater than a first threshold density, where M or N is equal to one, at least one pixel value corresponding to a first or last pixel of a row of horizontally adjacent pixels, or to a first or last pixel of a column of vertically adjacent pixels, may advantageously be "off", and where M and N are both greater than one, at least one pixel value corresponding to a pixel of a first or last row of horizontally adjacent pixels may advantageously be "off" and/or at least one pixel value corresponding to a pixel of a first or last column of vertically adjacent pixels may advantageously be "off".

In this way, dots constituted by isolated pixels or isolated small blocks of horizontally adjacent and vertically adjacent pixels in accordance with the invention can be used in portions of an image of which the densities of the dots are sufficiently high that the isolated pixels or isolated small blocks of pixels can reliably be marked by an output device, whereas dots constituted by larger blocks of pixels can be used in portions of the image of which the densities of the dots are sufficiently low that isolated pixels or isolated small blocks of pixels cannot reliably be marked by the output device.

Where M and N are both greater than one and for densities of dots greater than the first threshold density, at least one pixel value corresponding to a pixel of a first or last row of horizontally adjacent pixels and/or at least one pixel value corresponding to a pixel of a first or last column of vertically adjacent pixels is "off", for densities of dots less than a second threshold density, pixel values corresponding to pixels that, if unmarked, would separate horizontally or vertically adjacent dots are preferably "on", the second threshold density being greater than the first threshold density.

For densities of dots less than a third threshold density, at least one pixel value corresponding to a pixel that, if unmarked, would separate horizontally or vertically adjacent dots is preferably "off", the third threshold density being greater than the second threshold density.

For densities of dots less than a fourth threshold density, at least one pixel value corresponding to a pixel that, if unmarked, would separate horizontally or vertically adjacent dots is preferably "on", the fourth threshold density being greater than the third threshold density.

Where M and N are both at least four, the at least one pixel value preferably corresponds to a pixel at or near to the middle of a row of horizontally adjacent pixels or column of vertically adjacent pixels that, if unmarked, would separate horizontally or vertically adjacent dots.

In this way, in portions of the image of which the densities of dots are relatively low, the pixels separating pairs of horizontally or vertically adjacent dots are marked, so as effectively to form a large block of $(2M-1)*(N-1)$ or $(M-1)*(2N-1)$ horizontally and vertically adjacent pixels that can reliably be marked by an output device, the proportion of the pixels separating pairs of horizontally or vertically adjacent dots that are marked decreasing with increasing density of dots so as to prevent portions of the image of which the densities of dots are higher from appearing too dark.

Where for at least some of the dots, the pixel values corresponding to the pixels of a first or last row of horizontally adjacent pixels and a first or last column of vertically adjacent pixels are "off", an output device may produce sufficient dot gain to join pairs of horizontally adjacent dots and pairs of vertically adjacent dots.

Some output devices may not produce sufficient dot gain, however, so that gaps are visible between pairs of horizontally adjacent dots and pairs of vertically adjacent dots.

For pairs of horizontally adjacent dots, therefore, at least one pixel value corresponding to a pixel of a column of vertically adjacent pixels that, if unmarked, would separate the dots may advantageously be "on", and for pairs of vertically adjacent dots, at least one pixel value corresponding to a pixel of a row of horizontally adjacent pixels that, if unmarked, would separate the dots may advantageously be "on".

Where M and N are both at least four, the at least one "on" pixel value corresponding to the pixel of the column of vertically adjacent pixels is preferably at or near to the middle of the column and the at least one "on" pixel value corresponding to the pixel of the row of horizontally adjacent pixels is preferably at or near to the middle of the row.

The invention also lies in an output device in which a program according to the invention is stored.

BRIEF DESCRIPTION OF THE DRAWINGS

The invention will now be described, by way of example, with reference to the accompanying drawings, in which.

DETAILED DESCRIPTION OF AN EMBODIMENT

Figure 1:
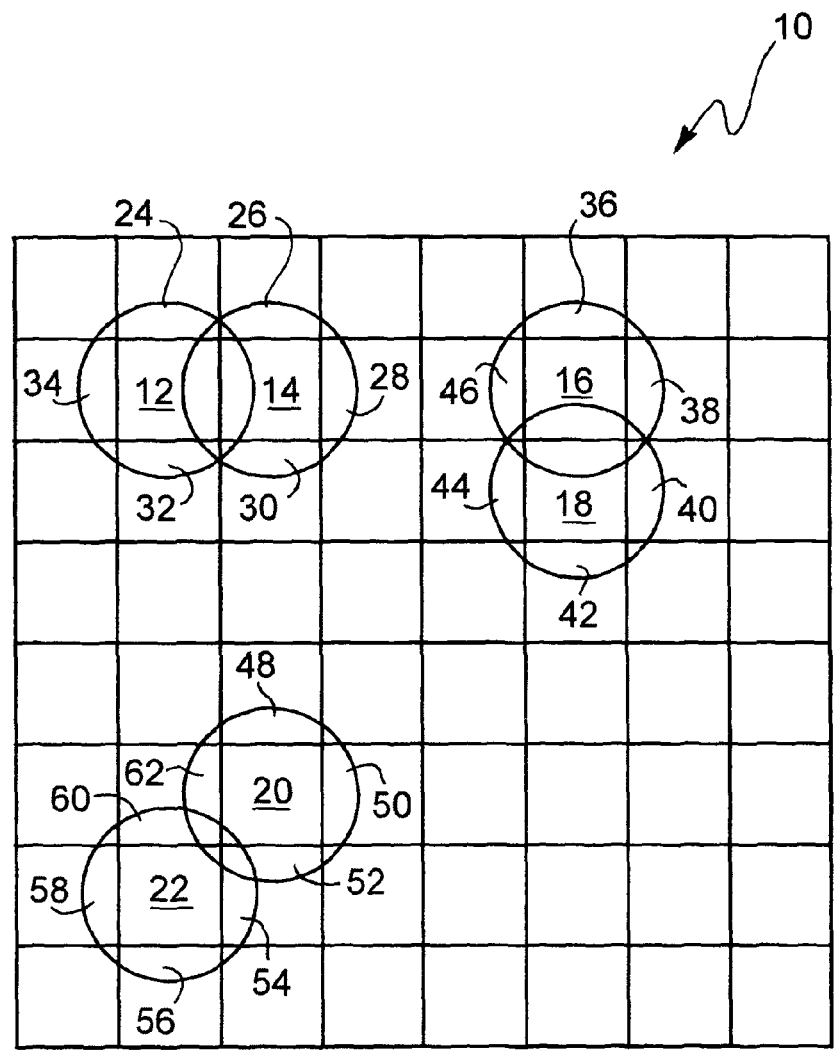
FIGS. 1 to 5 are schematic representations of portions of an output medium.
Figure 2:
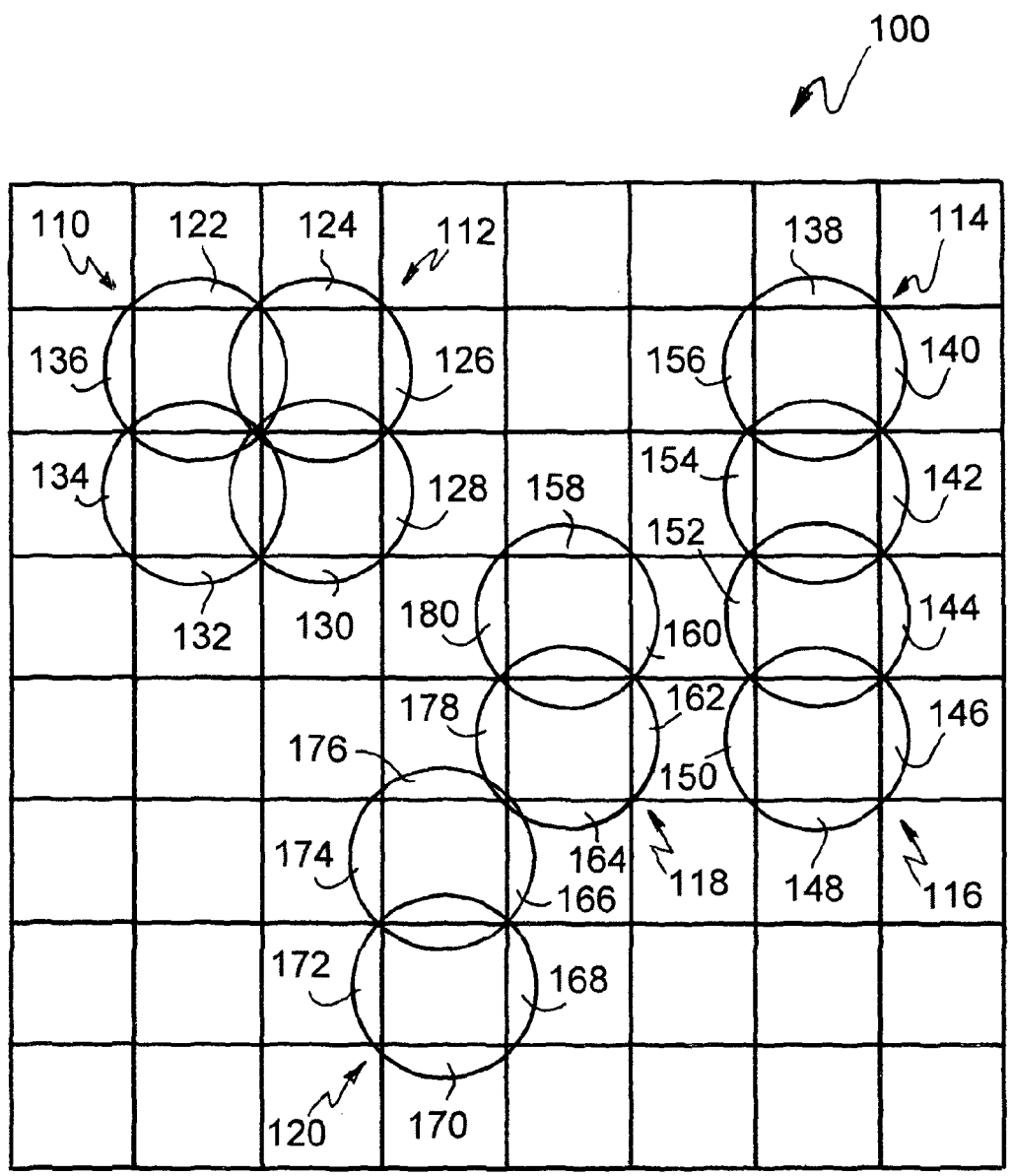
Figure 3:
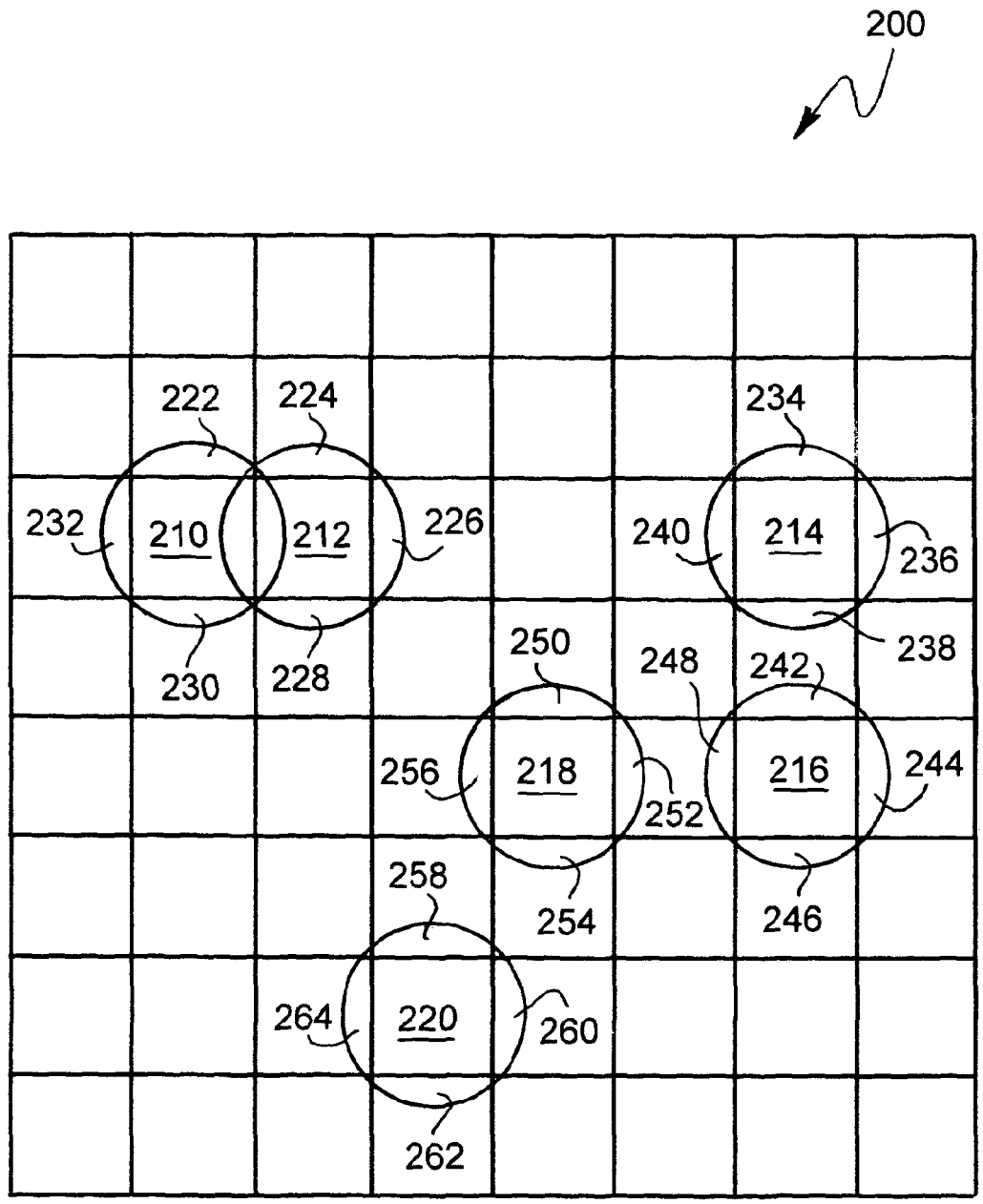
Figure 4:
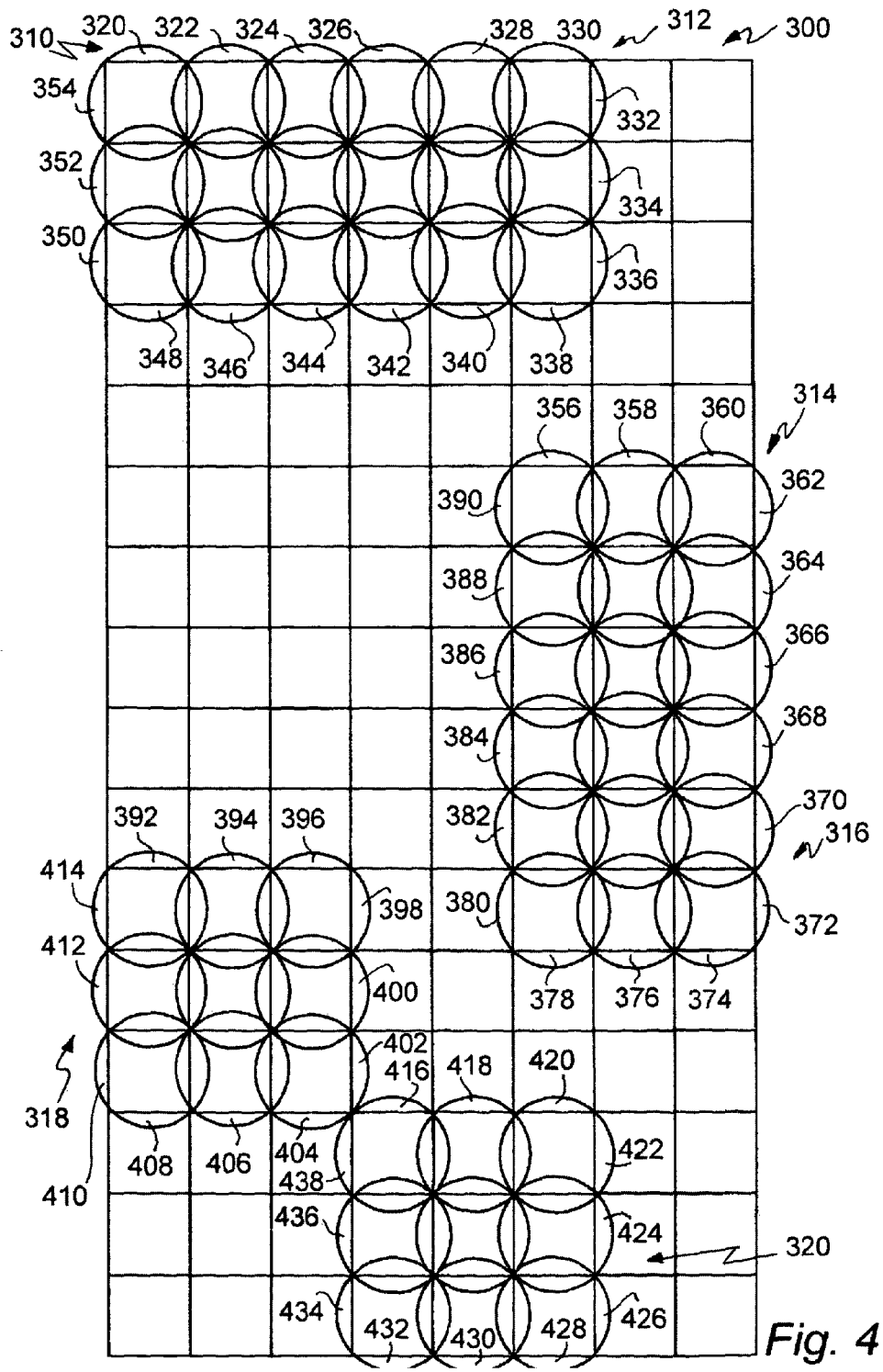
Figure 5:
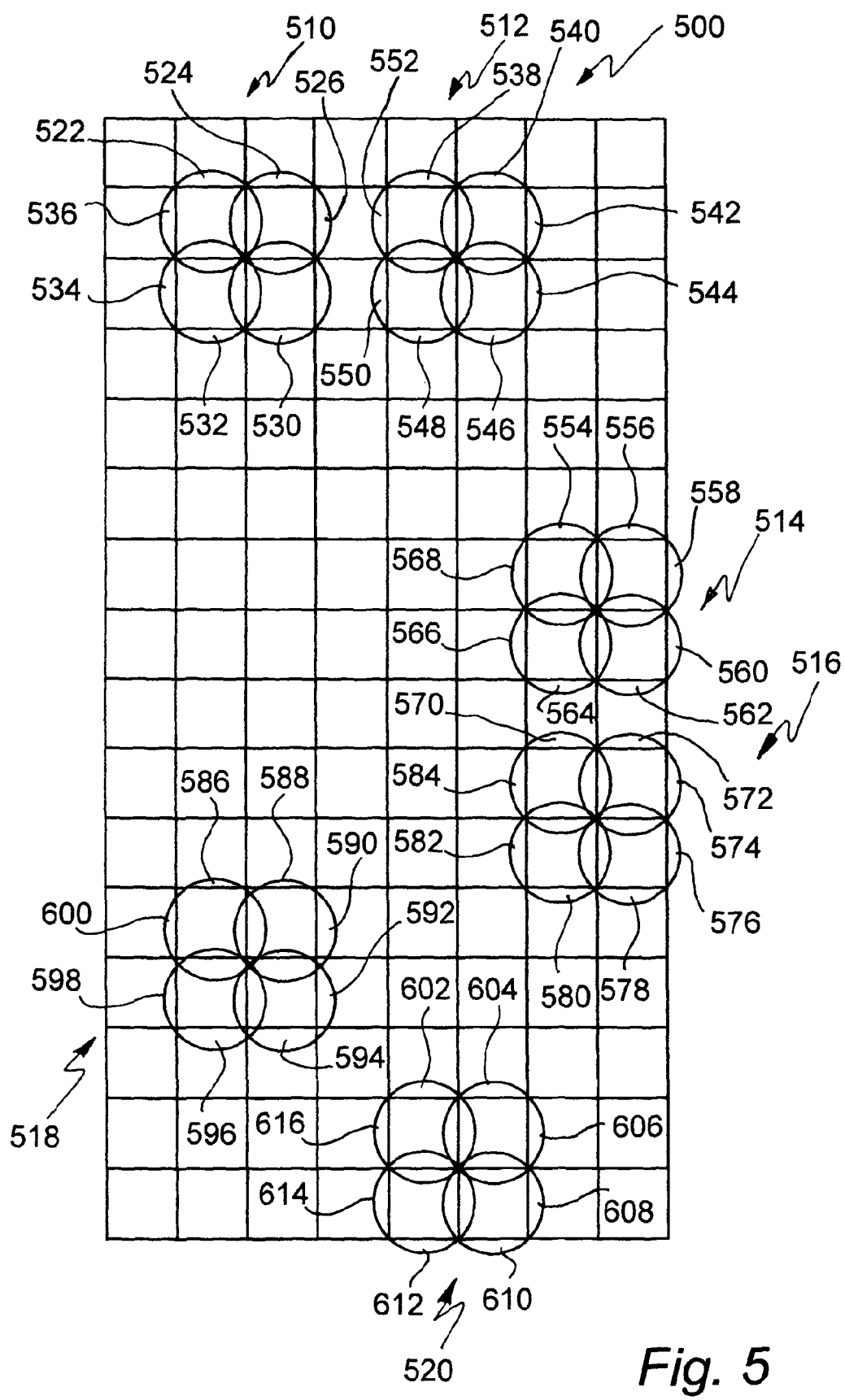
Figure 6:
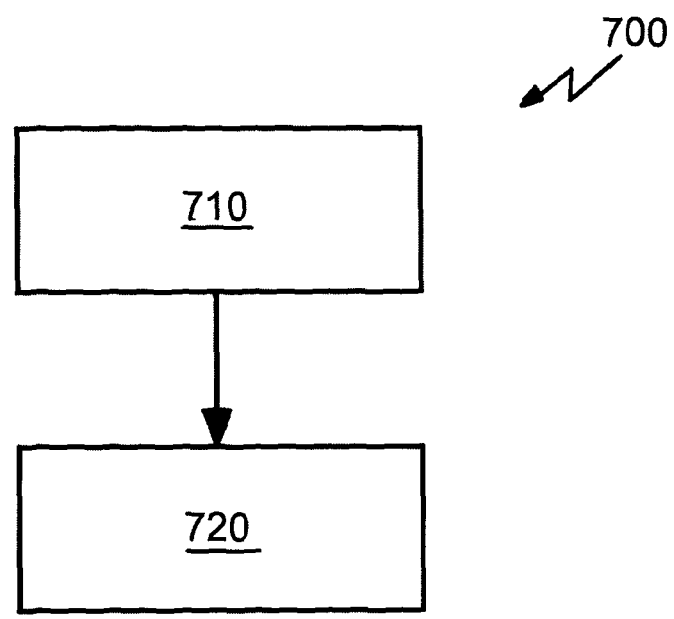
FIGS. 6 and 7 are flow diagrams of a computer process executed by a computer program in accordance with the invention.

FIG. 6 shows a computer process 700 that is executed by a computer program in accordance with the invention. The computer process comprises first and second steps 710 and 720 respectively.

The first step comprises receiving multiple-bit image data in the form of 8-bit continuous tone raster image data. The image data comprise an array of X*Y pixel values in the range 0 to 255.

Figure 7:
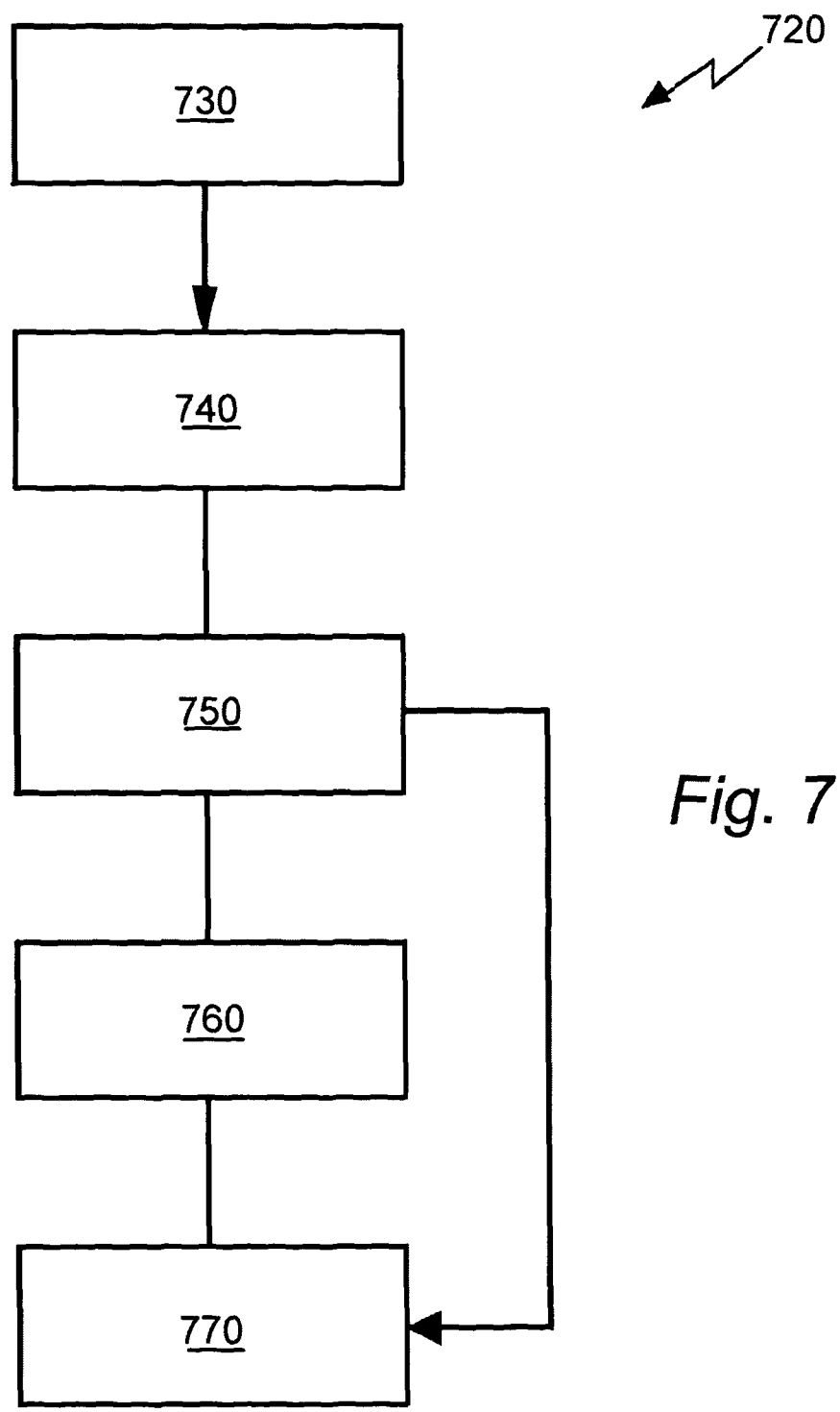

The second step 720 is shown in FIG. 7 and comprises the operations of receiving 730 values defining the sizes of full-sized and reduced-sized dots that are to be used to produce an image using the computer program, receiving 740 instructions as to whether reduced-sized dots or full-sized dots are to be used in portions of the image of which the densities of dots are low, receiving 750 instructions as to whether pixels are to be marked between reduced-sized dots to join horizontally and vertically adjacent reduced-sized dots in portions of the image of which the densities of dots are low, if not, receiving 760 instructions as to whether pixels are to be marked between all pairs of horizontally or vertically adjacent reduced-sized dots and, if so, what pattern of pixels is to be marked, and deriving 770 1-bit image data in the form of an array of X*Y "on" and "off" pixel values from the multiple-bit image data, which, when printed on an output medium by an output device, produce an image constituted by dots of the specified size or sizes.

The operation 730 of receiving values defining the sizes of full-sized and reduced-sized dots that are to be used to produce the image comprises receiving a first value M that defines a width in pixels of a full-sized dot, and a second value N that defines a height in pixels of the full-sized dot. Typically M and N are selected to be equal, so that the full-sized dot is square, although this is not essential. The computer program provides for the use of full-sized dots from 1*2 or 2*1 pixels up to 6*6 pixels.

The operation 730 also comprises receiving a first value S that defines a width in pixels of a reduced-sized dot, and a second value T that defines a height in pixels of the reduced-sized dot.

For example, where it is specified that the full-sized dot is to be 4*4 pixels, it would typically be specified that the reduced-sized dot is to be 3*3 pixels, the reduced-sized dot then being obtained by not marking the pixels of a first row of horizontally adjacent pixels and not marking the pixels of a first column of vertically adjacent pixels, which pixels would be marked to obtain the full-sized 4*4 pixel dot.

However, where it is specified that the full-sized dot is to be 4*4 pixels, it could be specified that the reduced-sized dot is to be 2*2 pixels, the reduced-sized dot then being obtained by not marking the pixels of first and last rows of horizontally adjacent pixels and not marking the pixels of first and last columns of vertically adjacent pixels, which pixels would be marked to obtain the full-sized 4*4 pixel dot.

Where it is specified that the full-sized dot is to be 4*4 pixels, it could even be specified that the reduced-sized dot is to be 3*2 pixels, the reduced-sized dot then being obtained by not marking the pixels of first and last rows of horizontally adjacent pixels and by not marking the pixels of a first column of vertically adjacent pixels, which pixels would be marked to obtain the full-sized 4*4 pixel dot.

It will be appreciated that it is desirable for the dots that constitute the image to be as small as possible, because if individual dots of the image cannot be discerned by the human eye, the image is less likely to have an appearance of graininess.

However, although some output devices such as inkjet printers are capable of reliably marking an isolated pixel of an output medium, that is a pixel surrounded by unmarked pixels, many output devices such as printing presses are incapable of marking an isolated pixel, so that these devices could not reliably print an image constituted by 1*2 or 2*1 pixel dots. Indeed, many such devices cannot reliably mark 2*2 pixel dots, although most can reliably mark 3*3 or 4*4 pixel dots. Typically the size of the full-sized dot would be selected so that a reduced-sized dot is the smallest dot that can reliably be marked by the output device with which the image is to be printed. So, for example, for an output device that can reliably mark 3*3 pixel dots, a 4*4 pixel full-sized dot and a 3*3 pixel reduced-sized dot would be specified in operation 730, so that the reduced-sized dots produced by the invention can reliably be printed.

As mentioned above, some output devices can reliably mark a small isolated block of horizontally and vertically adjacent pixels in portions of an image of which the densities of dots are high, that is say where there is a high proportion of marked pixels in the neighbourhood of the block of horizontally and vertically adjacent pixels, but cannot reliably mark a small isolated block of horizontally and vertically adjacent pixels in portions of an image of which the densities of dots are low.

By way of example, a particular output device might be able reliably to mark a 2*2 pixel block of horizontally and vertically adjacent pixels in a portion of an image of which the densities of dots are high, and be able reliably to mark a 3*3 pixel block of horizontally and vertically adjacent pixels in a portion of an image of which the densities of dots are low. In that case, it would be specified in operation 730 that a 3*3 pixel full-sized dot and a 2*2 pixel reduced-sized dot are to be used, and in operation 740 it would be specified that reduced-sized dots are not to be used in portions of the image of which the densities of dots are low.

Where the image is to be printed using an output device that can reliably mark a small isolated block of horizontally and vertically adjacent pixels in portions of the image of which the densities of dots are high, but cannot reliably mark a small isolated block of horizontally and vertically adjacent pixels in portions of an image of which the densities of dots are low, in operation 750 it would be specified that horizontally and vertically adjacent dots in portions of the image of which the densities of dots are low are to be joined by marking the pixels separating the dots. This has the effect of increasing the sizes of the blocks of horizontally and vertically adjacent pixels in portions of the image of which the densities of dots are low to sizes that can reliably be marked by the output device.

If it is specified in operation 750 that horizontally and vertically adjacent dots in portions of the image of which the densities of dots are low are to be joined, operation 760 would be omitted.

As also mentioned above, some output devices produce sufficient dot gain to mark a row of horizontally adjacent pixels or a column of vertically adjacent pixels corresponding to "off" pixel values that separate a pair of vertically adjacent or horizontally adjacent dots. If in operation 750 it was specified that horizontally and vertically adjacent dots in portions of the image of which the densities of dots are low are not to be joined, it can be specified in operation 760 that pixels are to be marked between horizontally and vertically adjacent dots in all portions of the image, regardless of the densities of dots in those portions. This can be used to avoid the appearance of gaps between horizontally and vertically adjacent dots. The pattern of pixels that are marked is chosen to avoid an appearance of gaps between horizontally and vertically adjacent dots whilst also, if possible, avoiding interference between diagonally adjacent dots.

In some circumstances, it may be desirable for gaps to appear between horizontally and vertically adjacent dots, for example to make such pairs of dots less conspicuous. In general, this can be achieved by specifying in operation 760 that pixels are not to be marked between horizontally and vertically adjacent dots. Where the image is to be printed using an output device that produces sufficient dot gain when marking horizontally or vertically adjacent reduced-sized dots also to mark a column or row of pixels that, if unmarked, would separate the reduced-sized dots, it would be specified in operation 730 that a 4*4 pixel full-sized dot and a 2*2 pixel reduced-sized dot are to be used, so as to ensure that horizontally and vertically adjacent dots are separated.

It should be noted that where it is specified in operation 750 that pixels are not to be marked between horizontally and vertically adjacent dots in portions of the image of which the densities of dots are low, dots may nevertheless be marked between such dots if it is specified in operation 760 that pixels are to be marked between horizontally and vertically adjacent dots, because such pixels are marked in all portions of the image, regardless of the densities of dots in those portions.

The operation 770 of deriving the 1-bit image data from the multiple-bit image data will now be described in detail, assuming that in operation 730 a 4*4 pixel full-sized dot and a 3*3 pixel reduced-sized dot were specified, in operation 740 instructions to use full-sized dots in portions of the image of which the densities of dots are low were received, in operation 750 instructions to mark pixels between horizontally and vertically adjacent dots in portions of the image of which the densities of dots are low were received, and that operation 760 was accordingly omitted.

The array of X*Y 8-bit pixel values is divided into (X/4)*(Y/4) sub-arrays of 4*4 8-bit pixel values, because a 4*4 pixel full-sized dot was specified. The average of the pixel values of each such sub-array is calculated and a first intermediate array of (X/4)*(Y/4) average pixel values is generated. A second intermediate array of 1-bit pixel values is created, each pixel value of the second intermediate array corresponding to an average pixel value of the first intermediate array.

A screening algorithm is applied to the first intermediate array of average pixel values and the corresponding 1-bit pixel values of the second intermediate array are set to "on" and "off" accordingly, "off" pixel values of the second intermediate array corresponding to blocks of unmarked pixels of an output medium, referred to in this specification as "non-dots" of the image and "on" pixel values corresponding to dots of the image.

The particular screening algorithm used is unimportant as it does not form part of this invention. It can be an AM screening algorithm or an FM screening algorithm, and if the latter, can use, for example, a threshold array or an error diffusion algorithm.

Figure 8:
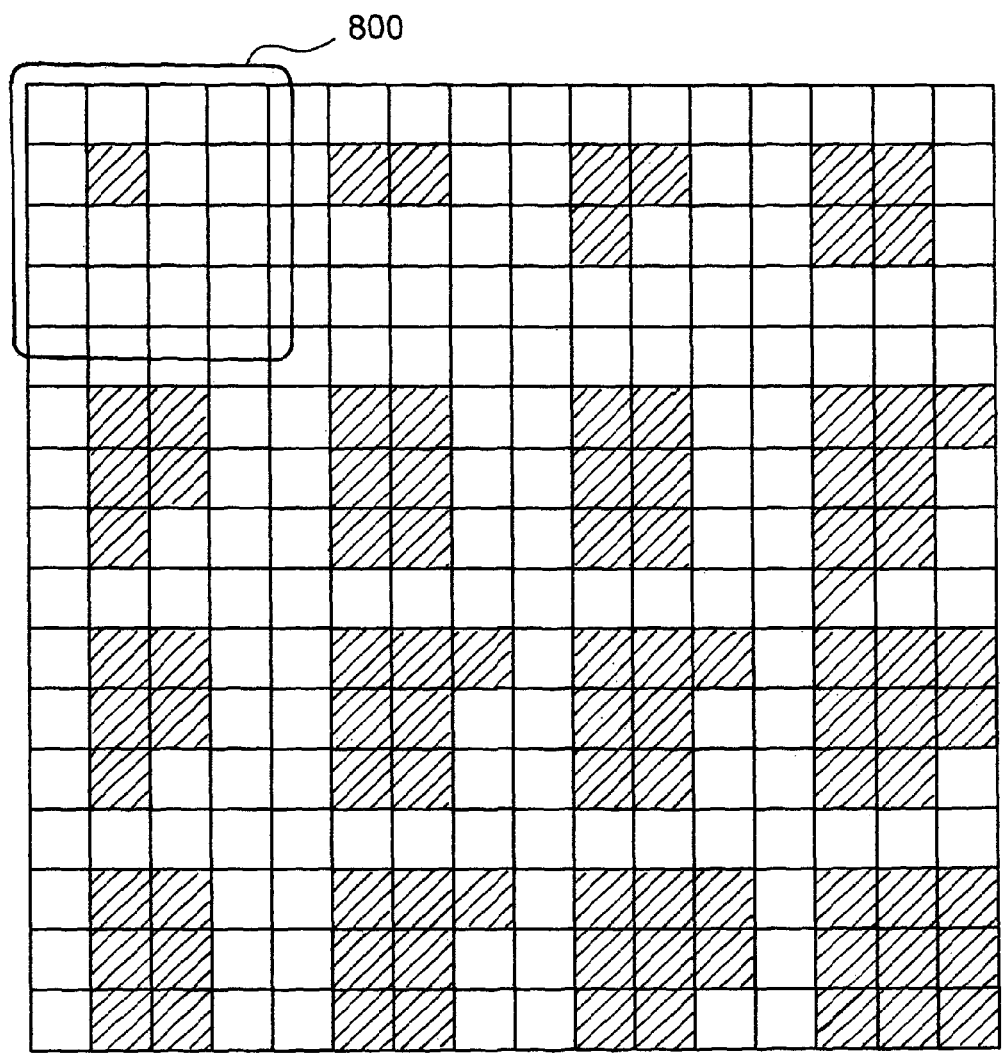
FIGS. 8 and 9 are schematic representations of portions of arrays of 1-bit pixel values that constitute a second intermediate array used to generate 1-bit image data.

FIG. 8 represents a portion of the second intermediate array when an AM screening algorithm has been applied to the average pixel values of the first intermediate array, "on" pixel values being represented by filled squares and "off" pixel values being represented by empty squares. It should be appreciated that each "on" pixel value of the second intermediate array will give rise to a dot when the 1-bit image data are printed, so that 1-bit image data generated using an AM screening algorithm will give rise to an image made up of clusters of dots, the clusters of dots being substantially regularly spaced throughout the image.

Figure 9:
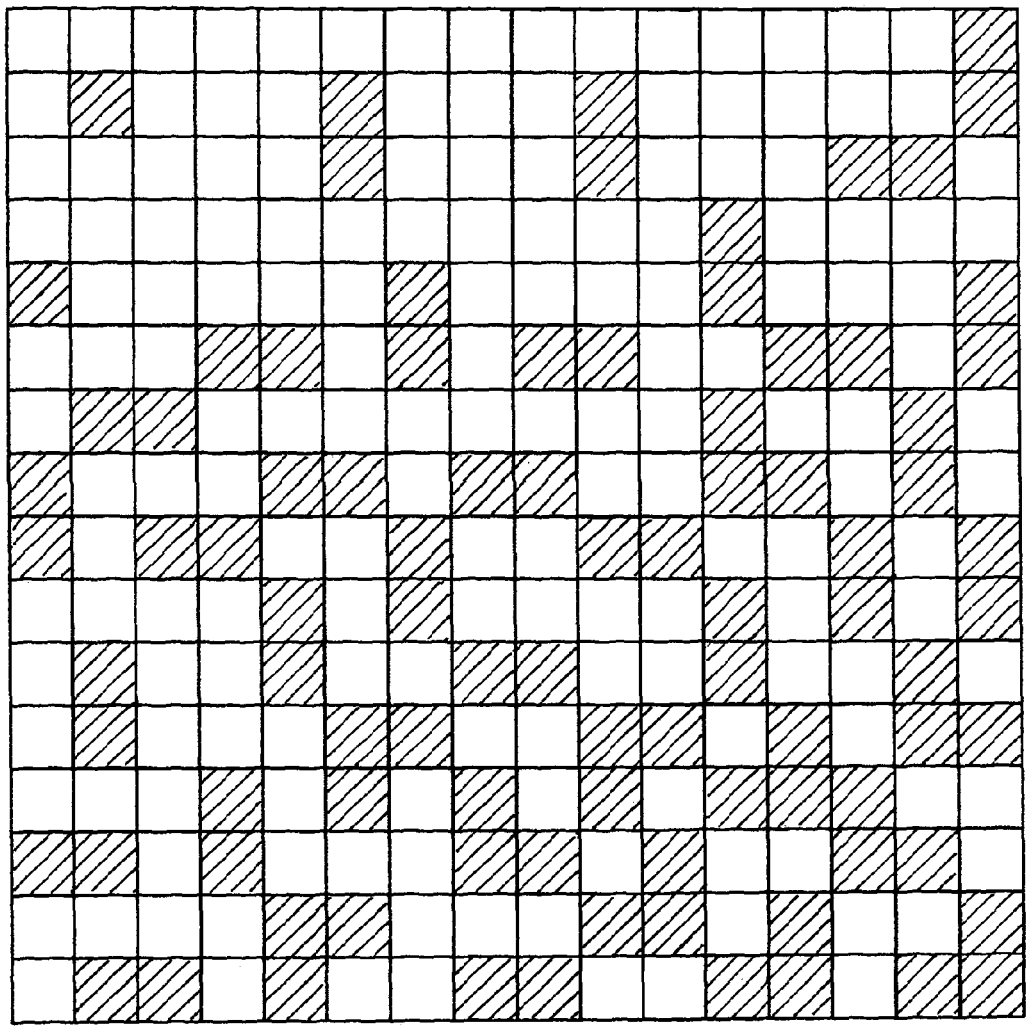

FIG. 9 represents a portion of the second intermediate array when an FM screening algorithm has been applied to the average pixel values of the first intermediate array.

Once the second intermediate array is complete, the (X/4)*(Y/4) "on" and "off" pixel values that constitute the second intermediate array are converted into an array of X*Y "on" and "off" pixel values. In general, each "on" pixel value of the second intermediate array is converted into a block of 3*3 horizontally and vertically adjacent "on" pixel values, which, when marked on an output medium constitute a 3*3 pixel dot.

Figure 10:
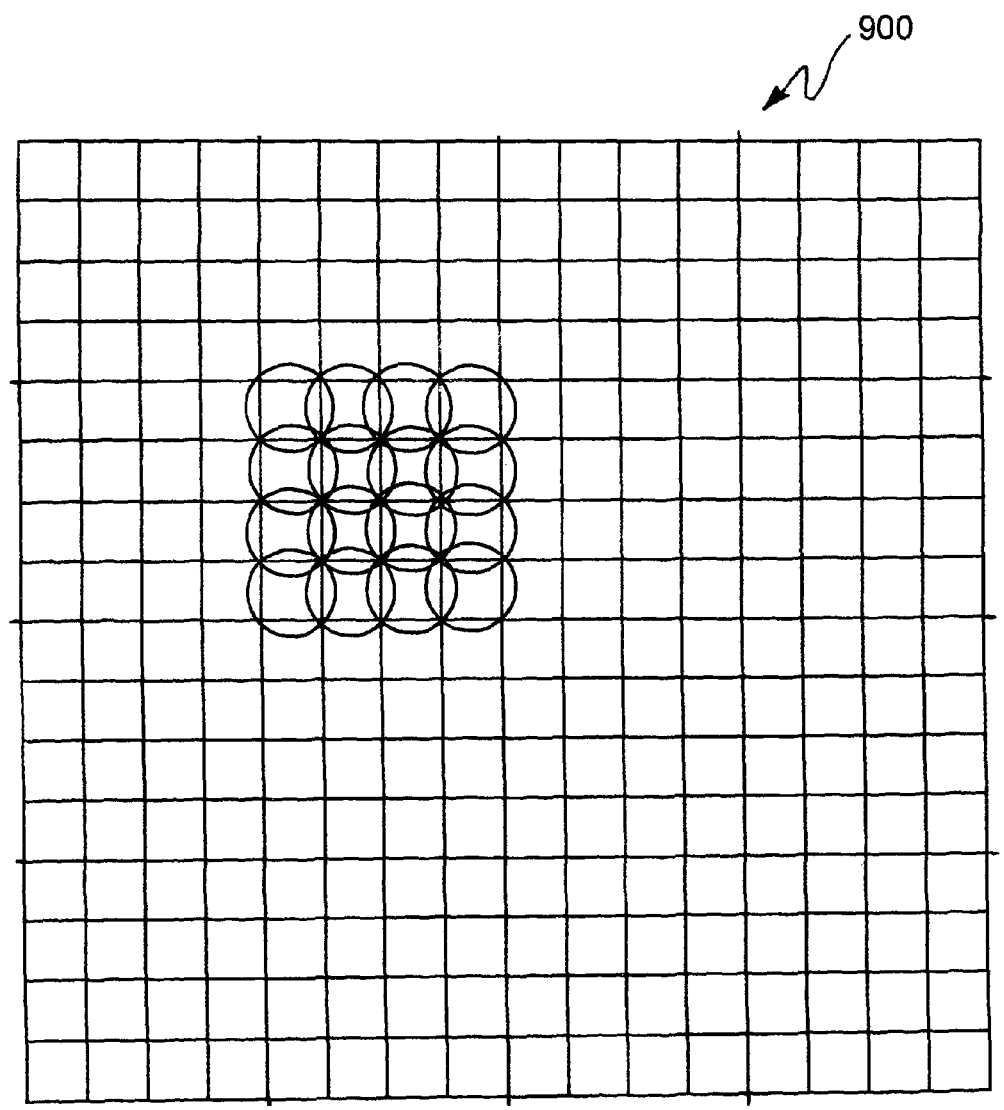
FIGS. 10 to 13 are schematic representations of portions of an output medium.

As it was specified in operation 740 that reduced-sized dots are not to be used in portions of the image of which the densities of dots are low, isolated "on" pixel values of the second intermediate array are converted into a block of 4*4 horizontally and vertically adjacent "on" pixel values. FIG. 10 represents a portion 900 of an output medium on which the 1-bit pixel values generated from the sixteen pixel values of the second intermediate array denoted by reference numeral 800 in FIG. 8 have been printed.

As it was specified in operation 750 that the pixels separating pairs of horizontally and vertically adjacent dots are to be marked in portions of the image of which the densities of dots are low, for each "on" pixel value of the second intermediate array in turn, it is determined whether the "on" pixel value has any horizontally or vertically adjacent "on" pixel values. If the "on" pixel value has no horizontally or vertically adjacent "on" pixel values, processing moves on to the next "on" pixel value. If the "on" pixel value has a horizontally or vertically adjacent "on" pixel value, it is determined whether the average pixel value of the first intermediate array to which the "on" pixel value corresponds is greater than 40%, that is 102 for 8-bit image data. If the average pixel value is greater than 40%, processing moves on to the next "on" pixel value.

If the average pixel value is less than or equal to 20%, the three pixel values of the 1-bit image data that correspond to a row of horizontally adjacent pixels or a column of vertically adjacent pixels that separate the block of 3*3 "on" pixel values generated from the "on" pixel value of the second intermediate array from the block of 3*3 "on" pixel values generated from the horizontally or vertically adjacent "on" pixel value of the second intermediate array are all set to "on".

If the average pixel value is greater than 20% and less than or equal to 30%, two of the three pixel values of the 1-bit image data that correspond to a row of horizontally adjacent pixels or a column of vertically adjacent pixels that separate the block of 3*3 "on" pixel values generated from the "on" pixel value of the second intermediate array from the block of 3*3 "on" pixel values generated from the horizontally or vertically adjacent "on" pixel value of the second intermediate array are set to "on".

If the average pixel value is greater than 30% and less than or equal to 40%, a middle one of the three pixel values of the 1-bit image data that correspond to a row of horizontally adjacent pixels or a column of vertically adjacent pixels that separate the block of 3*3 "on" pixel values generated from the "on" pixel value of the second intermediate array from the block of 3*3 "on" pixel values generated from the horizontally or vertically adjacent "on" pixel value of the second intermediate array is set to "on".

Figure 11:
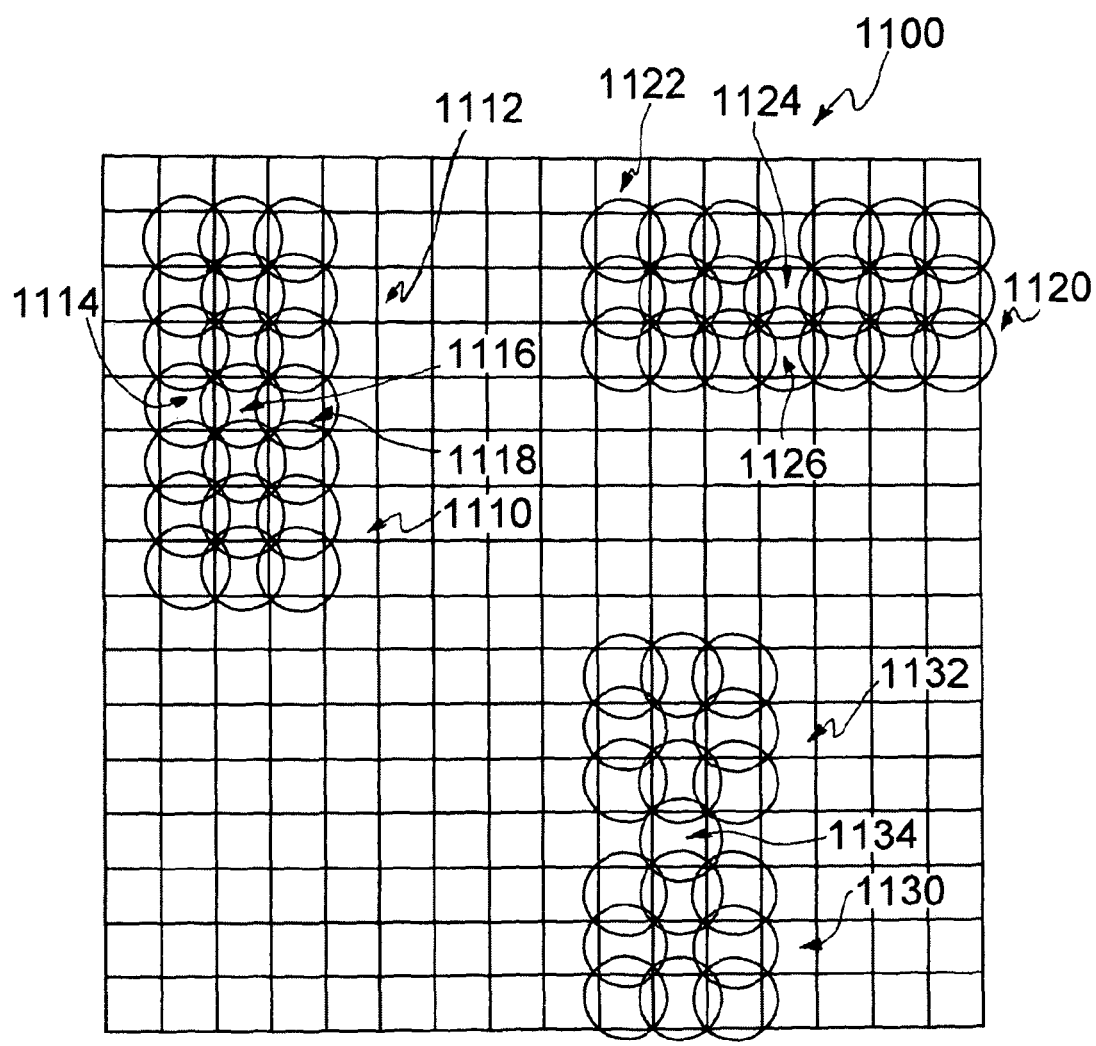

FIG. 11 represents a portion 1100 of an output medium on which a block 1110 of 3*3 pixels has been marked, the block corresponding to a block of 3*3 "on" pixel values of the 1-bit image data generated from an "on" pixel value of the second intermediate array, the "on" pixel value corresponding to an average pixel value of the first intermediate array of 36, that is less than 20%. As there was a vertically adjacent "on" pixel of the second intermediate array, a block 1112 of 3*3 pixels has also been marked, as have a row of three horizontally adjacent pixels 1114, 1116 and 1118 that separate the blocks 1110 and 1112.

A block 1120 of 3*3 pixels has been marked, the block corresponding to a block of 3*3 "on" pixel values of the 1-bit image data generated from an "on" pixel value of the second intermediate array, the "on" pixel value corresponding to an average pixel value of the first intermediate array of 62, that is less than 30%. As there was a horizontally adjacent "on" pixel of the second intermediate array, a block 1122 of 3*3 pixels has also been marked, as have two (1124 and 1126) of the three vertically adjacent pixels that separate the blocks 1120 and 1122.

A block 1130 of 3*3 pixels has been marked, the block corresponding to a block of 3*3 "on" pixel values of the 1-bit image data generated from an "on" pixel value of the second intermediate array, the "on" pixel value corresponding to an average pixel value of the first intermediate array of 96, that is less than 40%. As there was a vertically adjacent "on" pixel of the second intermediate array, a block 1132 of 3*3 pixels has also been marked, as has a middle one (1134) of the three horizontally adjacent pixels that separate the blocks 1130 and 1132.

Had it been specified in operation 750 that horizontally and vertically adjacent dots are not to be joined in portions of the image of which the densities of dots are low, it could have been specified in operation 760 that the pixels separating all pairs of horizontally or vertically adjacent dots are to be marked. If so, the 1-bit image data would be modified so that at least one pixel value of each row of horizontally adjacent pixel values that separates a pair of vertically adjacent blocks of 3*3 "on" pixel values and each column of vertically adjacent pixel values that separates a pair of horizontally adjacent blocks of 3*3 "on" pixel values is "on".

The pattern of "on" pixel values used to join adjacent dots is at the choice of the user of the computer program. It is preferable to use the "centre join" pattern shown joining blocks 1130 and 1132 in FIG. 11. If marking a single pixel does not result in sufficient dot gain to avoid the appearance of gaps between adjacent dots, the "offset join" pattern of two marked pixels shown joining blocks 1120 and 1122 in FIG. 11 can be used. If this does not result in sufficient dot gain to avoid the appearance of gaps between adjacent dots, which is unlikely, the "full join" pattern of three marked pixels shown joining blocks 1110 and 1112 in FIG. 11 can be used. This is not desirable, however, as it can give rise to some interference between diagonally adjacent dots, which is the cause of patterning.

Figure 12:
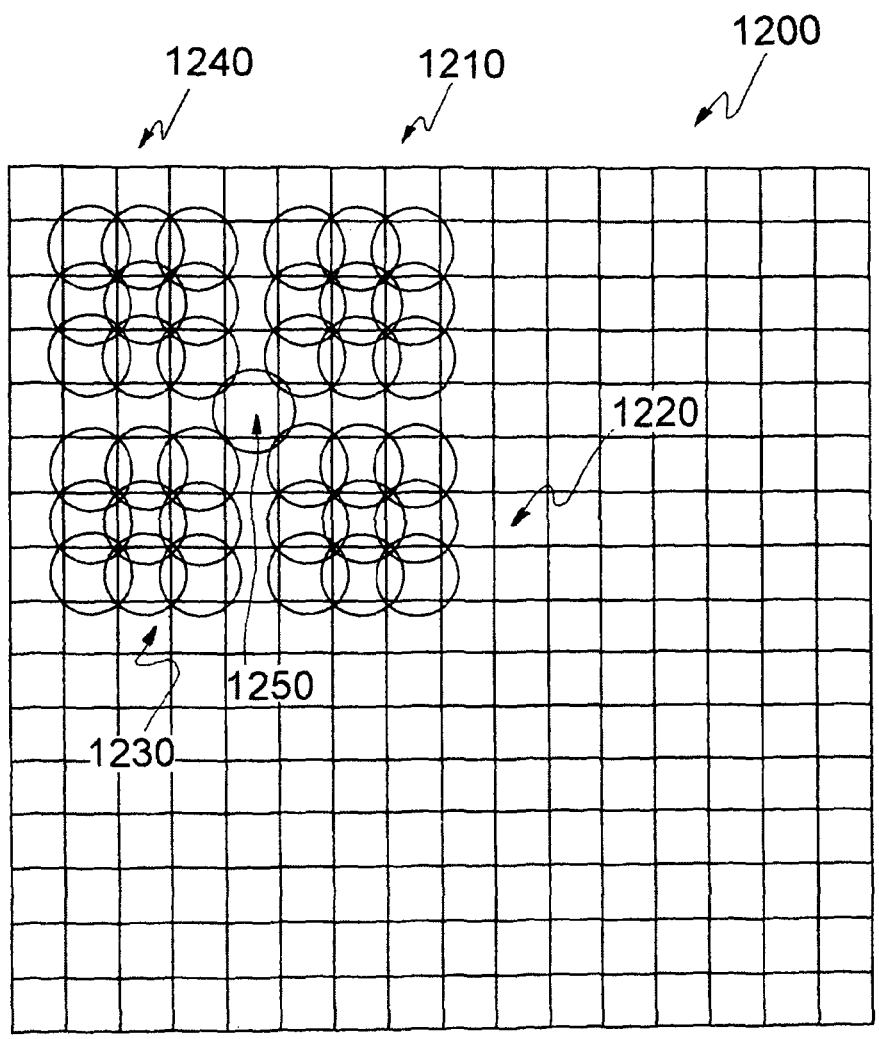

In deriving the 1-bit image data, blocks of 2*2 horizontally and vertically adjacent "on" values of the second intermediate array are identified and the 1-bit image data are modified so that a pixel value at the intersection of a row of horizontally adjacent pixels and a column of vertically adjacent pixels that separate a block of 2*2 horizontally and vertically adjacent blocks of 3*3 horizontally and vertically adjacent "on" pixel values is "on". This is necessary where the dot gain produced by an output device is sufficient to mark a pixel when marking horizontally adjacent pixels either side of the pixel or when marking vertically adjacent pixels above and below the pixel, but insufficient to mark the pixel when marking diagonally adjacent pixels at opposite corners of the pixel. FIG. 12 represents a portion 1200 of an output medium on which four such 3*3 blocks 1210, 1220, 1230 and 1240 of horizontally and vertically adjacent pixels have been marked, as well as a middle pixel 1250 at the intersection of the row of horizontally adjacent pixels and the column of vertically adjacent pixels that separate the blocks 1210, 1220, 1230 and 1240.

Figure 13:
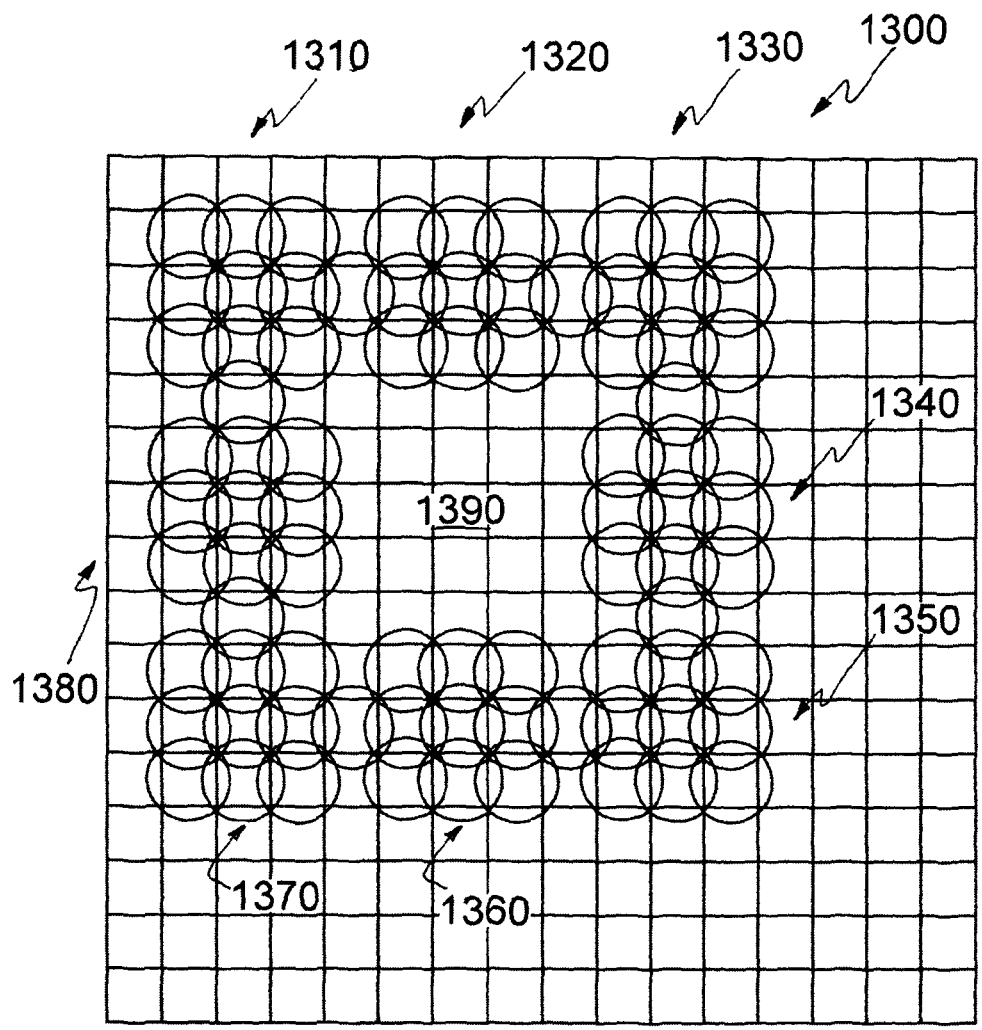

FIG. 13 represents a portion 1300 of an output medium on which eight 3*3 pixel dots 1310, 1320, 1330, 1340, 1350, 1360, 1370 and 1380 joined by centre join marked pixels have been marked. The eight dots surround a non-dot 1390. It is to be noted that despite the dot gain produced by the output device, a block of 3*3 horizontally and vertically adjacent unmarked pixels is present in the middle of the eight dots. It is believed that this characteristic of the invention enables shadows of greater than 99% tone value reliably to be printed. It is also believed that the use of full-sized dots in portions of the image of which the densities of dots are low enables highlights of less than 1% tone value reliably to be printed.

It will be appreciated that the foregoing description relates to only one embodiment of the invention and that the invention encompasses other embodiments as defined by the claims.

The invention claimed is:

1. A computer system executed process for generating 1-bit image data from multiple-bit image data, the process comprising the steps of:
    receiving, by the computer system, multiple-bit image data comprising multiple-bit pixel values; and
    deriving, by the computer system, from the multiple-bit pixel values 1-bit image data comprising "on" and "off" pixel values, each pixel value of the 1-bit image data corresponding to a pixel of an output medium, which pixel an output device would attempt to mark when printing the 1-bit image data if the pixel value were "on", the 1-bit image data producing when printed an image constituted by dots, each dot corresponding to a plurality of pixel values of the 1-bit image data, which pixel values correspond to a block of M*N horizontally and/or vertically adjacent pixels of an output medium, at least one of M and N being greater than one, wherein for at least some of the dots, where M or N is equal to one, a pixel value corresponding to a first or last pixel of a row of horizontally adjacent pixels, or to a first or last pixel of a column of vertically adjacent pixels, is "off", and where both M and N are greater than one, at least one pixel value corresponding to a pixel of a first or last row of horizontally adjacent pixels is "off" and/or at least one pixel value corresponding to a pixel of a first or last column of vertically adjacent pixels is "off".

2. The process of claim 1, wherein the 1-bit image data produce when printed an image constituted by a plurality of densities of dots.

3. The process of claim 1, wherein both of M and N are greater than one, and for at least some of the dots, at least one pixel value corresponding to a pixel of at least one of first and last rows of horizontally adjacent pixels of the block is "off" and at least one pixel value corresponding to a pixel of at least one of first and last columns of vertically adjacent pixels of the block is "off".

4. The process of claim 3, wherein for at least some of the dots, the pixel values corresponding to the pixels of at least one of first and last rows of horizontally adjacent pixels and at least one of first and last columns of vertically adjacent pixels are "off".

5. The process of claim 1, wherein for densities of dots greater than a first threshold density, where M or N is equal to one, a pixel value corresponding to a first or last pixel of a row of horizontally adjacent pixels, or to a first or last pixel of a column of vertically adjacent pixels, is "off", and where M and N are both greater than one, at least one pixel value corresponding to a pixel of a first or last row of horizontally adjacent pixels is "off" and/or at least one pixel value corresponding to a pixel of a first or last column of vertically adjacent pixels is "off".

6. The process of claim 5, wherein M and N are both greater than one and for densities of dots less than a second threshold density, pixel values corresponding to pixels that, if unmarked, would separate horizontally or vertically adjacent dots, are "on", the second threshold density being greater than the first threshold density.

7. The process of claim 6, wherein for densities of dots less than a third threshold density, at least one pixel value corresponding to a pixel that, if unmarked, would separate horizontally or vertically adjacent dots, is "off", the third threshold density being greater than the second threshold density.

8. The process of claim 7, wherein for densities of dots less than a fourth threshold density, at least one pixel value corresponding to a pixel that, if unmarked, would separate horizontally or vertically adjacent dots, is "on", the fourth threshold density being greater than the third threshold density.

9. The process of claim 8, wherein M and N are both at least four, and the at least one pixel value corresponds to a pixel at or near to the middle of a row of horizontally adjacent pixels or column of vertically adjacent pixels that, if unmarked, would separate horizontally or vertically adjacent dots.

10. The process of claim 3, wherein for pairs of horizontally adjacent dots, at least one pixel value corresponding to a pixel of a column of vertically adjacent pixels that, if unmarked, would separate the dots, is "on", and for pairs of vertically adjacent dots, at least one pixel value corresponding to a pixel of a row of horizontally adjacent pixels that, if unmarked, would separate the dots, is "on".

11. The process of claim 10, wherein M and N are both at least four, and the at least one "on" pixel value corresponding to the pixel of the column of vertically adjacent pixels is at or near to the middle of the column and the at least one "on" pixel value corresponding to the pixel of the row of horizontally adjacent pixels is at or near to the middle of the row.

12. An output device having computer readable storage media including computer-executable instructions that when executed direct the output device to perform the process of claim 1.

13. A method for electronically generating 1-bit image data from multiple-bit image data, the 1-bit image data comprising "on" and "off" pixel values, each pixel value of the 1-bit image data corresponding to a pixel of an output medium, which pixel an output device would attempt to mark when printing the 1-bit image data if the pixel value were "on", the method comprising the steps of:
    storing, by a computer system, multiple-bit image data comprising multiple-bit pixel values in electronic memory; and
    deriving, by a computer system, from the multiple-bit pixel values and storing in electronic memory 1-bit image data that produces when printed an image constituted by dots, each dot corresponding to a plurality of pixel values of the 1-bit image data, which pixel values correspond to a block of M*N horizontally and/or vertically adjacent pixels of an output medium, at least one of M and N being greater than one, wherein for at least some of the dots, where M or N is equal to one, a pixel value corresponding to a first or last pixel of a row of horizontally adjacent pixels, or to a first or last pixel of a column of vertically adjacent pixels, is "off", and where both M and N are greater than one, at least one pixel value corresponding to a pixel of a first or last row of horizontally adjacent pixels is "off" and/or at least one pixel value corresponding to a pixel of a first or last column of vertically adjacent pixels is "off".

14. Computer readable storage media including computer-executable instructions that when executed direct a computer to perform the method of claim 13.

15. A computer programmed to perform the method of claim 13.

\* \* \* \* \*